United States Patent

Kautz

[15] 3,699,534

[45] Oct. 17, 1972

[54] CELLULAR ARITHMETIC ARRAY

[72] Inventor: William H. Kautz, Woodside, Calif.

[73] Assignee: The United States of America as represented by the Secretary of the Navy

[22] Filed: Dec. 15, 1970

[21] Appl. No.: 98,245

[52] U.S. Cl. ........ 340/172.5

[51] Int. Cl. ....... G11c 9/00, G11c 19/00, G06f 13/00

[58] Field of Search ........ 340/172.5

[56] References Cited

UNITED STATES PATENTS

| | | | |
|---|---|---|---|
| 3,505,653 | 4/1970 | Kautz | 340/172.5 |
| 3,550,092 | 12/1970 | Yoshimaru et al. | 340/172.5 |
| 3,544,973 | 12/1970 | Borck, Jr. et al. | 340/172.5 |
| 3,514,760 | 5/1970 | Kautz | 340/172.5 |
| 3,473,160 | 10/1969 | Wahlstrom | 340/172.5 |
| 3,441,912 | 4/1969 | Henle | 340/172.5 |
| 3,391,390 | 7/1968 | Crane et al. | 340/172.5 |
| 3,376,555 | 4/1968 | Crane et al. | 340/172.5 |
| 3,331,055 | 7/1967 | Betz et al. | 340/172.5 |

*Primary Examiner*—Gareth D. Shaw
*Attorney*—R. S. Sciascia, Arthur L. Branning and James G. Murray

[57] ABSTRACT

A cellular arithmetic array for use in a multiprocessor having the facility provided to either read-out, write-in, or increment by one the binary word stored in each row of the array during a single clock cycle.

2 Claims, 2 Drawing Figures

INVENTOR.
WILLIAM H. KAUTZ
BY
ATTORNEY

CELLULAR ARITHMETIC ARRAY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates to digital logic circuits which are useful in digital computers and other digital data handling apparatus.

Digital processing equipment often requires a system of storage or memory for use in the desired computations. In these memory systems it may be desirous that the previously stored words be changed or operated on while in the memory. In the prior art systems this required very complex arrangements of digital circuitry and often several steps to accomplish memory changes.

SUMMARY OF THE INVENTION

The invention provides a circuit for storing digital words and operating on these stored words while in the memory and utilizes a large number of identical cells connected together in rows and columns to form a two dimensional structure, or matrix, which is well adapted for fabrication by integrated semiconductor technology. The use of identical cells allows economical manufacturing of a large number of these cells which may be directly interconnected to form an array.

The array, as mentioned, consists of rows and columns of identical cells where each row acts as a counting register capable of storing digital words. These words, under the control of W and Z-registers, may be read-in from an input X-register which parallel loads any word location (row) in the array, read-out from any word location (row) to an output U-register or moved or incrementally increased while in the array.

OBJECTS OF THE INVENTION

An object of the invention is to provide an improved cellular arithmetic array.

Another object is the provision of an improved cellular arithmetic array which is particularly useful in a multi-processor and has the capability of operating on binary words to read-in, read-out, store, move while stored and alter while stored the binary words operated on.

Yet another object of the present invention is to provide an improved cellular arithmetic array which is particularly useful in a multiprocessor and which consists of a plurality of identical cells.

DESCRIPTION OF THE DRAWINGS

Other objects, advantages and novel features of the invention will become apparent from the following detailed description of the invention when considered in conjunction with the accompanying drawings wherein.

DESCRIPTION OF THE PREFERRED EMBODIMENT

Figure 1:
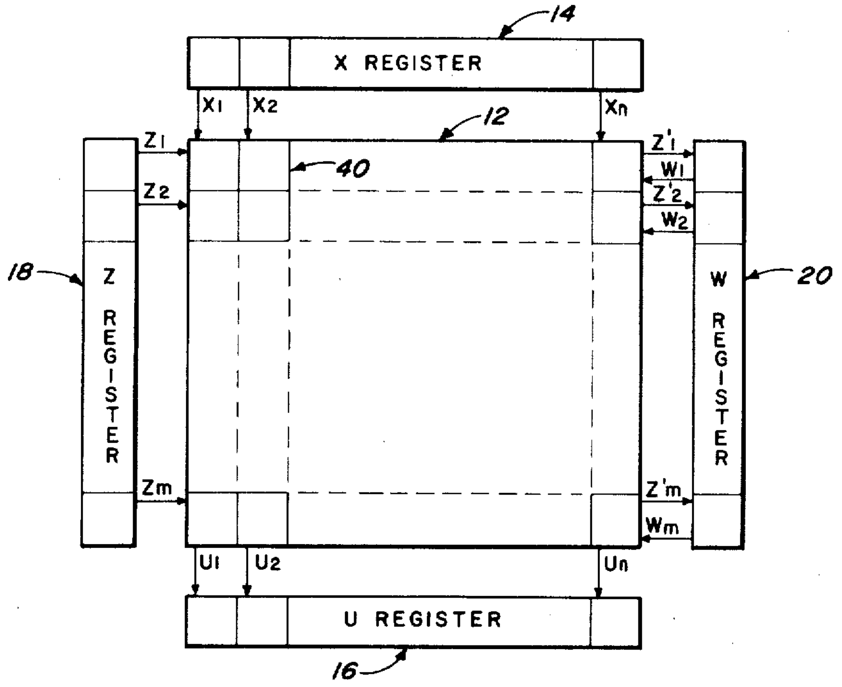
FIG. 1 is a representation of the cellular arithmetic array of the invention and FIG. 2 is a schematic diagram of one of the cells of the array of FIG. 1.

FIG. 1 illustrates an embodiment of the invention comprising an array 12 of identical cells 40 arranged in rows and columns and having a number of connections along the edges of the array. The X-register 14 is connected to the leads $X_1$ through $X_n$ on the upper edge of the array and the U-register 16 is connected to the $U_1$ through $U_n$ output leads of the array. It should be noted that the X-register 14 could be used as both an input and output register in place of the U-register by connecting the U outputs as inputs to the X-register. The Z-register 18 is connected by the $Z_1$ through $Z_m$ leads to the array rows, and the W-register 20 is similarly connected by the $W_1$ through $W_m$ leads to the array rows and to the outputs of the $Z_1'$ through $Z_m'$ overflow connections of the array rows. Thus, we have an array of m rows of n length wherein each of the rows is controlled by the W and Z inputs as set forth in the following table

| W | Z | Word operation |
|---|---|---|
| 0 | 0 | No change |
| 0 | 1 | Add one to word |
| 1 | 0 | Read out word into U |
| 1 | 1 | Write X into row |

The four registers (X, U, W and Z) are conventional in design, being in essence a cascade of flip-flops with independent means for setting and resetting. These registers are used only as buffers between the array and the digital system of which the array is a part, and any one or more may be dispensed with if the signal timing characteristics of the system permit. The W-register may be used as an overflow detector should this be desirable in the system.

Looking at the array operation as a whole, assuming that the array is partially filled with words and that a new word to be read-in is stored in the X-register with the least significant digit at the left. Further, assume also that the W and Z-registers have been filled so that:

1. every row which is to receive the input word from the X-register has 1's in the corresponding row positions in both the W and Z-registers (an exception is explained below);
2. every row which is to be read out into the U-register has a 1 in the W-register in that row, and a 0 in the Z-register in that row (if more than one word is read out at the same time, they are combined by Boolean addition);
3. every row whose contents is to be increased by one by binary addition (with carries) has a 0 in the W-register in that row and a 1 in the Z-register in that row;
4. every other row has 0's in the corresponding row positions in both the W and Z-registers; the contents of these rows will remain unchanged.

Assuming the above conditions exist, and a single clock pulse C is now applied to the cells in the array and to the flip-flops of the output U-register, the above described operations will be performed in each of the word locations (rows) in the array in accordance with the W and Z inputs which correspond with the particular word locations (rows).

As will be more apparent to the reader from the later description of the cell 40 and FIG. 2, not all of the above described operations can be performed simultaneously, i.e., on a single clock pulse. An important limitation, worthy of emphasis, is that read-in and read-out of non-zero words cannot be accomplished by a single clock pulse.

The operational limitation referred to above, arises from the fact that the read-in line and the read-out line are shared in each cell of the array, so that read-in and read-out of non-zero words cannot be performed simultaneously. However, the array has the advantageous capability of moving a word from a upper position to any lower position in the array. Further, the Boolean sum of any subset of words in upper positions can be moved to any one or more lower positions in the array, simultaneous with the incrementing operation being performed on any subset of the remaining words not involved in read-in or read-out.

Figure 2:
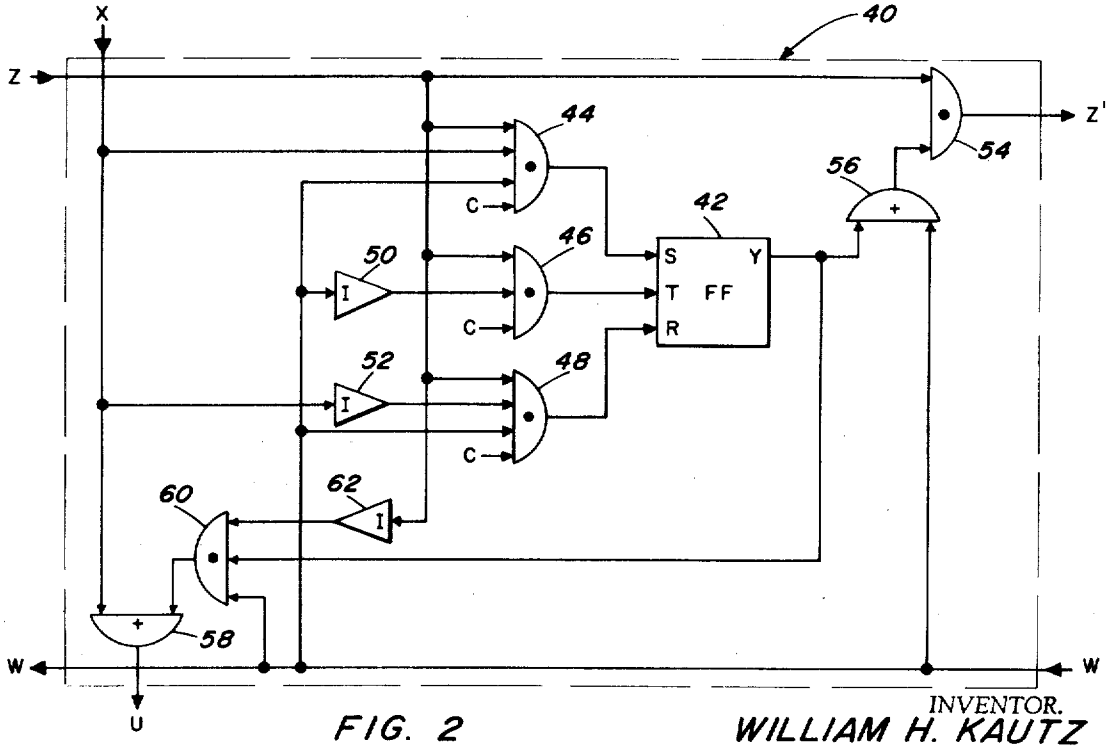

Referring to the FIG. 2, cell 40 represents one cell of the array 12 which is identical to the other cells of the array. The cell consists of a set, reset or toggle flip-flop 42 which stores the state of the cell, thereby, defining one binary digit, of a word, represented by output Y. Each row of array 12 is composed of n cells, each of which stores a digit of the word stored in that row. When the flip-flop is set, the output Y becomes a 1. When the flip-flop is reset, the output Y becomes a 0. When the flip-flop is toggled, the output changes from its previous state, that is from a 1 to a 0 from a 0 to a 1 depending on the prior state of the output. The flip-flop 42 is controlled by AND gates 44, 46 and 48, so that the set, reset and toggle operations are defined by the following cell equations:

$$SET(Y) = WZCX; Y = 1$$

$$TOGGLE(Y) = WZC; Y \text{ changes from previous state}$$

$$RESET(Y) = WZCX\ Y = 0$$

Thus, it is seen that to set the flip-flop 42 the inputs to AND gate 44 must be WZCX from the cell inputs wherein each input is a 1. To toggle the flip-flop 42, the inputs to AND gate 46 must be the negation of W (W = 0), supplied through inverter 50 from cell input W, and ZC = 1. To reset the flip-flop 42, the inputs to the AND gate 48 must be WZC = 1 and the negation of X (X =0) supplied through inverter 52 from cell input X.

The cell output binary equations are defined as follows:

$$Z^1 = Z(W + Y)$$

$$U = X + WZY$$

where U and $Z^1$ represent the outputs of the individual cells which in turn become the X and Z inputs to the adjacent cells in the array.

The $Z^1$ cell output is obtained from AND gate 54, which has a first input from the Z cell input and a second input from OR gate 56, which has a first input from the W cell input bus and a second input from the output Y of the flip-flop 42. The U cell output is obtained from OR gate 58 which has a first input from the X cell input and a second input from AND gate 60, which in turn has a first input from the W cell input bus, a second input from the output Y of the flip-flop 42 and a third input which is the negation of the Z cell input supplied through inverter 62.

The operation of a single cell is thus defined from the following table:

| W | Z | Operation |
|---|---|---|
| 0 | 0 | No change |
| 0 | 1 | Add one to $Z^1$ (toggle flip-flop 42) |
| 1 | 0 | Read out Y into U |
| 1 | 1 | Write X into Y |

Considering FIGS. 1 and 2 together, the reader will observe that each cell 40 in a row of cells receives the same signal via a bus lead from the W-register 20. When the W bus signal is 1, this signal is passed through OR gate 56 to AND gate 54 so that the Z-cascade is effectively closed and behaves like a direct bus through the array, i.e., whatever Z value is imposed on the row by the register 18 is imposed on every cell 40 in the row. When this Z value is 0, the inverter 62 and AND gate 60 causes the Y output of flip-flop 42 to be (Boolean) added to the X input and become the U output of the cell and the X input of the cell below. When this Z value is 1, the AND gate 60 does not pass a signal and the X cell input is identical with the U cell output. The Z= 1 signal enables the AND input gates 44, 46 and 48 of flip-flop 42. Since W = 1, gate 46 is disabled and gate 44 will set the flip-flop 42 if X = 1 and inverter 52 and gate 48 will reset the flip-flop-flop 42 if X = 0, i.e. Y = X.

The operation of the invention (and more particularly of a row of cells 40) in the event the W-bus carries the value 0, will now be considered. Since every AND gate 60 in every cell in the row receiving the 0 signal from the W-register 20 will be disabled, the X input and U output signals of every cell 40 in the row will be identical, i.e. X = U for each cell 40. The operational limitation which arises from combining of read-in and read-out functions on a single line has previously been discussed and, by now, will be more apparent. It will also be apparent that only the toggle input AND gate 46 of flip-flop 42 is enabled and will be driven by the Z input, which is (of course) the "carry" output of the cell 40 to the left. In other words, when W = 0, the row of cells also acts as a binary counter which is driven by the input from the Z-register 18 to incrementally alter a word stored in the row.

It will be apparent to the reader that the array 12 of cells 40 may be used to accept, store, and release binary words in the fashion of a scratch-pad memory in the central procession of a digital computer. In addition, any subset of words being stored may be modified, by having each of their binary values increased by one binary digit per clock pulse. While the input-output capacity of the array is limited to a single non-zero word per clock pulse (even though a word may be duplicated in the array during write-in, and words may be combined by Boolean addition during read-out), the incrementing operation may be performed in a single clock pulse on as many words as are contained in the entire array. This incrementing capability should prove to be very useful in many common operations, particularly the indexing of the addresses of instructions and operands during normal computing.

While a particular embodiment of the invention has been illustrated and described, it should be understood that many modifications and variations may be made by those skilled in the art.

What is claimed and desired to be secured by Letters Patent of the United States is:

1. A clock driven cellular arithmetic array for storing binary words and preforming operations thereon comprising:

a plurality of cells arranged in rows and columns;

input means for supplying binary input signals to the columns of said array, and;

a first and second means for controlling the operations of the cells of any row of the array;

wherein the binary words stored in any row may be read-in or read-out simultaneously with the changing of any other word by an increment of one binary number during one clock pulse;

each of said cells has three inputs and two outputs;

one of said inputs being a bus connected in parallel to each of said cells in a particular row;

the second of said inputs being operationally connected in series, the output of one cell being the input to the next cell;

the first and second inputs being derived from the first and second means, and;

the third input being derived from the input means;

the two outputs of each of the cells being supplied one to the next cell in the same row as the cell supplying the output and the other to the next cell in the same column as that of the cell supplying the outputs;

said one output being defined by the equation:

$$Z' = Z(W + V)$$

said other output being defined by the equation:

$$U = X + WZY$$

where Z' represents said one output, X, Z' and W represent said third, second and one of said inputs, Y represents the memory state of said cell, and Z represents the inversion of Z.

2. A circuit for processing digital words comprising:

a matrix array of a plurality of identical cells connected together to form rows and columns;

an input register connected to each cell in the top row of said matrix array;

an output register connected to each cell in the bottom row of said matrix array;

first control register means connected directly to each of said plurality of identical cells and functioning to apply the same binary signal to every cell in a row, and;

second control register means connected to said matrix array and functioning to apply the same signal directly to every cell in a row when the signal applied by said first control register means is of one binary value and to apply a signal directly to only one cell in a row when the signal applied by said first control register means is of the other binary value;

wherein each cell comprises:

a flip-flop having an output and three inputs, said output being 1 when set by one of said inputs, 0 when reset by a second of said inputs and changed when toggled by the third of said inputs;

first, second and third AND gates connected to said set, toggle and reset controls of said flip-flop;

a first output;

a second output, and;

circuit means connected to said first, second and third AND gates, to said first and second control register means, to the output of said flip-flop and to said first and second outputs and functioning to control said first and second outputs.

* * * * *